Oct. 27, 1953 H. T. PRIOR 2,657,262

CARRIER TELEGRAPH SYSTEM

Filed Sept. 18, 1951

Inventor
HECTOR T. PRIOR
By [signature]
Attorney

Patented Oct. 27, 1953 2,657,262

UNITED STATES PATENT OFFICE 2,657,262

CARRIER TELEGRAPH SYSTEM

Hector Thomas Prior, London, England, assignor to International Standard Electric Corporation, New York, N. Y., a corporation of Delaware Application September 18, 1951, Serial No. 247,065
In Great Britain September 22, 1950

7 Claims. (Cl. 178—69)

Figure 1:
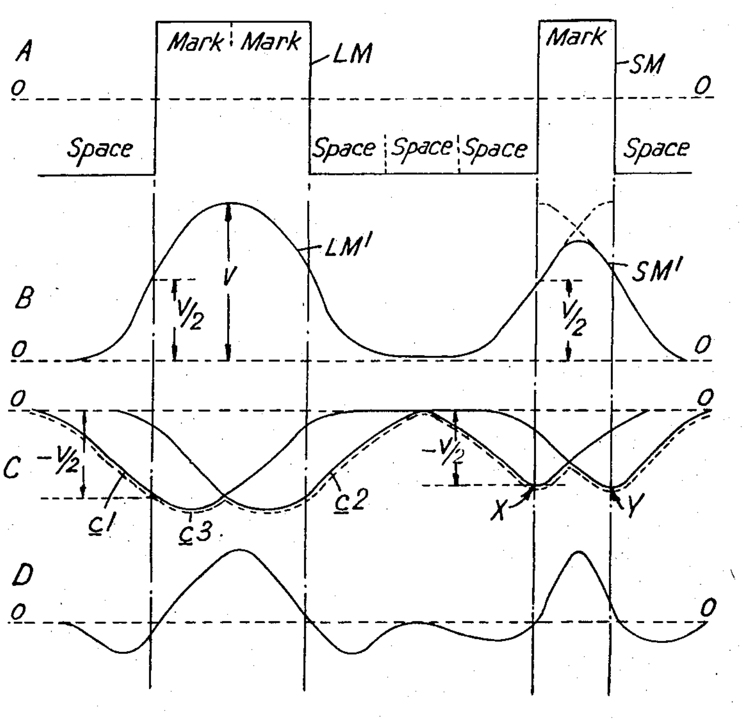

This invention relates to receivers for amplitude modulated carrier telegraph systems. By the term "amplitude modulated carrier telegraph systems" is meant systems in which the transmitter transmits constant frequency carrier waves, amplitude-modulated by telegraph signals, over a line or other communication medium to a receiver incorporating means for extracting the telegraph signals from the modulated carrier waves.

In the usual amplitude-modulation telegraph systems, it is well known that as a result of the transmission characteristics of the transmission path, the substantially rectangular signal waves originally obtained from the transmitting teleprinter or other signalling device, appear at the receiver after demodulation in considerably rounded form. The problem therefore arises of deriving from the received signal wave the correct instants of transition from mark to space and vice-versa.

The methods of de-modulating the received signal which have in general been adopted hitherto are based upon the principle that, provided the signalling speed does not exceed a certain maximum value, the internal transmission characteristics of the receiving circuit can be so chosen that the times when the received signal amplitude passes through a value equal to half the maximum amplitude are spaced substantially in the same way as the vertical edges of the rectangular signals originally transmitted. If a bias equal to half the maximum amplitude and of opposite polarity is applied to such a signal wave, the signal instants can readily be maintained correctly. Since the general amplitude level of the transmitted signals may vary during a period of signalling as a result, for example, due to the vagaries of the transmitting medium, it is usual to derive this bias from the received signal wave itself.

As the transmitting speed is increased, there comes a point at which the transitions defining the shortest signals interfere with each other and prevent the full amplitude being attained. In other words, a transition from, say, mark to space may not be completed before the succeeding transition from space to mark begins and the two wave-form transients intersect before the point of maximum amplitude is attained.

Provided the time interval between transitions is not made too small, the reduction in amplitude of these shorter waves does not affect the height on the transition curves at which the points corresponding to the original signal transitions occur. Thus, application of the same value of bias as before will still give the correct result. If, however, this bias were simply arranged to follow the contour of the received signal, the diminished signals would have applied to them a diminished bias voltage.

To overcome this difficulty it has been customary to introduce into the bias-deriving portion of the receiver a "memory" device employing a condenser storage circuit with a long time constant. This maintains the biassing potential at substantially the same level even when the signal amplitude is reduced temporarily by sending shorter signals. A receiving arrangement for a carrier telegraph system in which such a device is employed is disclosed in the specification of the co-pending application of V. J. Terry, T. F. S. Hargreaves, and H. T. Prior, filed November 30, 1949, and bearing Serial No. 130,326, now Patent No. 2,613,272. This method suffers from the disadvantages that on the one hand, a general fall in the signal amplitude—due, for example, to a change in the transmitting conditions—is not appreciated until a number of characters have been incorrectly biassed and lost. On the other hand, the occurrence of a short burst of high level interference results in an artificial raising of the bias potential so that characters are again lost until the bias falls back to the normal maximum signal amplitude.

According to the present invention there is provided a receiving circuit for an amplitude modulated carrier telegraph system comprising means for deriving a biassing potential from the received signals to be combined therewith in order to maintain in the combined signal the correct instants of transition between marks and spaces, characterised by the provision of means for deriving two separate sets of such biassing potentials, one for the transitions from space to mark and the other for the opposite transitions.

By the term "mark" is meant the condition of when a given positive potential is present on the signalling line and by the term "space" is meant the opposite condition when either zero potential or a negative potential is present depending upon whether single-current or double-current signalling is in use.

Figure 2:
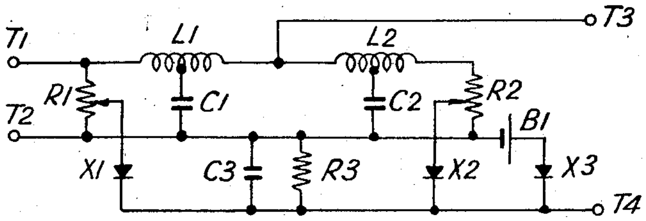

The invention will now be more fully described with reference to the accompanying drawings in which:

Fig. 1 comprises a set of curves of wave form which will be used in the explanation of the invention and Fig. 2 is a circuit diagram of part of a telegraph receiver incorporating an embodiment of the invention.

In Fig. 1 curve A shows the rectangular signals produced by the telegraph transmitter. These are generally in double-current form, that is to say they are in the form of equal positive and negative voltages or currents with respect to a zero axis O shown in dotted line. The positive signals will be designated marks and the negative signals spaces. The signal waveform shown in curve A may be regarded as being made up of a combination of eight equi-length elements namely S M M S S S M S. Furthermore the first seven elements will be seen to constitute a conventional start-stop teleprinter signal combination containing a start (space) element, five permutable elements which in this case represent the character "A," and a concluding stop (mark) element. As is well known two or more consecutive elements of the same kind are transmitted without a break so as to constitute a single marking or spacing impulse. In the following description a single mark (or space) element will be referred to as a short mark (or space) signal while two or more consecutive mark (or space) elements will be referred to as a long mark (or space) signal.

When the rectangular signals of curve A are applied to modulate a carrier wave, the arrangement is such that a carrier wave of constant amplitude is transmitted for mark signals and no carrier wave for space signals, so that transmission is effectively of single-current type.

When the modulated carrier wave is rectified at the receiving end, the recovered signal wave is also of single-current type and may appear as shown in curve B. Owing to the transmission characteristics of the transmission path, the rectangular signals are considerably rounded and the leading and trailing edges are appreciably inclined from the vertical as indicated in curve B. If the marking signals are long enough as shown at LM in curve A, the curve has time to reach the correct maximum amplitude V as shown at $LM^1$ in curve B. Similarly, if the spacing signals are long enough, the curve has time to reach the zero axis O. However, with a short marking signal such as SM of curve A, the signal transits from space to mark and mark to space interfere with each other and produce an attenuated wave form as shown at $SM^1$ of curve B. In both cases, however, the points on the curve corresponding to the original signal transits occur at a level of V/2 which represents half the maximum amplitude. It follows that if a biassing wave opposite in sign but similar in shape to the signal wave of curve B be derived, the points at which this wave passes through a value of V/2 will be spaced apart by the same distances as those which separate the half-amplitude points on the curve B.

Turning to the curves at C of Fig. 1 there are shown two biassing waves, one (c1) for dealing with space to mark transitions and the other (c2) for mark to space transitions. Each of them is of the same shape as the received signal of curve B but reversed in sign and diminished in amplitude. Curve c1 is advanced in phase relative to the signal wave and curve c2 is delayed with respect to the signal wave by the same interval. This interval is chosen to make the minimum negative peaks X and Y occur at the signal transits in the case of the shortest mark signal S M. The amplitude of the bias waves is such that they assume half the steady-state value V/2 of the signal wave at the signal transits of a long mark signal $LM^1$. These two waves are applied to the received signal wave in the form of a combined bias wave whose value at any point is equal to that of the stronger wave at that point. The combined bias wave is shown as a dotted curve c3.

The wave produced by combining the bias wave c3 with the received signal wave is shown in curve D of Fig. 1. It will be seen that this wave passes through zero at times corresponding to the instants of transition of the original rectangular telegraph signals of curve A.

A method of producing the bias wave c3 and of adding it to the received signal wave B of Fig. 1 will now be explained with reference to Fig. 2. Referring now to Fig. 2, teleprinter signals after demodulation by a previous stage (not shown) of the receiver appear across terminals T1 and T2 with a waveform such as that shown by the curve B of Fig. 1. During a mark signal the potential of T1 rises to a value V relative to T2 which is assumed to remain at zero potential. During a space signal both terminals are at zero potential. The demodulated wave is applied to two delay networks in series, L1, C1 and L2, C2. These networks are of the type in which a voltage applied at the input terminals appears at the output terminals altered in phase but not in magnitude. The two bias waves c1 and c2 (Fig. 1) are derived from potentiometers R1 and R2 respectively. If the output signal wave is taken from terminals T3 and T4 between the two networks it will be evident that it will be delayed relative to the space to mark bias c1 and advanced relative to the mark to space bias c2. By this means the space to mark bias c1 appears to "lead" the signal wave although this is in fact impossible since the bias wave cannot appear until the signal wave appears.

A portion of the signal wave appearing across potentiometer R1 is applied via rectifier X1 to one electrode of a condenser C3. Similarly a portion of the signal wave appearing across potentiometer R2 is applied via rectifier X2 to the same electrode of condenser C3. The time-constant of C3 and its shunt resistor R3 is so chosen that the condenser remains charged up to the value of the stronger bias wave at any instant, thus producing the combined bias wave c3 of Fig. 1.

It will be noticed that in the middle of a long spacing period the combined signal and bias wave of curve D goes back to zero and there would be some tendency to instability in a relay which was being supplied from terminals T3 and T4. Furthermore, during a prolonged period of space due for example to the opening of the line there would be a possibility of the receiving relay being changed over to mark by impulsive interference. In order to meet these contingencies an auxiliary biassing potential shown purely diagrammatically as a single cell B1 is connected through a rectifier X3 to terminal T4. This puts a spacing bias on the output circuit in the absence of any other potential. When the voltage across C3 rises to a value above that of B1, X3 is blocked and B1 does not have any effect.

The circuit of Fig. 2 can be simplified (with little change in performance) by omitting the second delay network L2, C2. With this modification the mark to space bias wave c2 follows the signal wave without delay and the condenser C3 plays a vital part in producing the mark to space bias, the time constant of R3, C3 being suitably adjusted to obtain a close approximation to the correct biassing potential at the signal instants.

While the principles of the invention have been described above in connection with specific embodiments and particular modifications thereof, it is to be clearly understood that this description is made by way of example and not as a limitation on the scope of the invention.

What is claimed is:

1. A receiving circuit for an amplitude modulated carrier telegraph system comprising means for deriving a first biassing potential wave from the received signal wave, means for deriving a second biassing potential wave from the received signal wave, means to advance the phase of said first biassing wave with respect to the phase of the received signal wave, means to retard the phase of said second biassing wave with respect to the phase of the received signal wave, and means coupled to said biassing potential wave deriving means for applying to said received signal wave whichever of said biassing waves is of greater amplitude at any given instant.

2. A receiving circuit as claimed in claim 1, wherein said means for deriving a first biassing potential wave comprises a first delay network, means for applying the unbiassed signal wave to the input to said first network, means for deriving from the input to said first network the space to mark biassing wave, means for deriving from the output of said first network mark to space biassing wave and means for deriving from the output of said first network the biassed signal wave.

3. A receiving circuit as claimed in claim 2, wherein said means for deriving a second biassing wave comprises a second delay network coupled to the output of said first network.

4. A receiving circuit as claimed in claim 2, further comprising auxiliary biassing means coupled to said means for deriving both said potential waves, whereby a predetermined biassing potential is applied to said receiving circuit independent of the receipt thereby of any received signal waves.

5. A receiving circuit as claimed in claim 1, wherein said means for applying to said received signal wave the biassing wave of greatest amplitude comprises a time constant network connected in common to both said biassing potential wave deriving means.

6. A receiving circuit as claimed in claim 5, wherein said biassing potential wave means comprises a plurality of unidirectional devices poled in the same direction, each one coupled between a different one of said means for deriving a biassing potential wave and said time constant network.

7. A receiving circuit as claimed in claim 6, wherein one of said unidirectional devices is coupled between said auxiliary biassing means and said time constant network.

HECTOR THOMAS PRIOR.

References Cited in the file of this patent

UNITED STATES PATENTS

| Number | Name | Date |
|---|---|---|
| 2,552,362 | Adams | May 8, 1951 |
| 2,568,019 | Martin | Sept. 18, 1951 |